June 11, 1929.  W. WEILER  1,717,290
INDUCTION MOTOR CONTROL SYSTEM
Filed Aug. 22, 1928
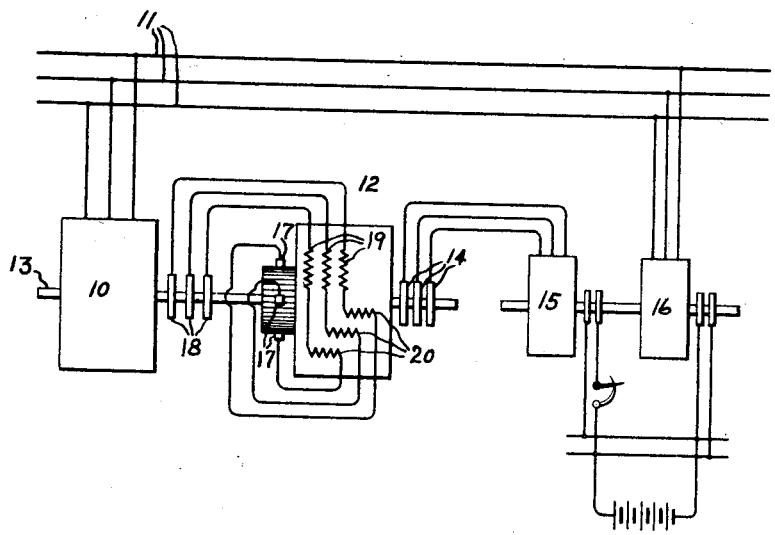
Inventor:
Wilhelm Weiler
by Charles E. Mullan
His Attorney Patented June 11, 1929.

1,717,290

UNITED STATES PATENT OFFICE.

WILHELM WEILER, OF NIEDERSCHONHAUSEN, GERMANY, ASSIGNOR TO GENERAL ELECTRIC COMPANY, A CORPORATION OF NEW YORK.

INDUCTION-MOTOR-CONTROL SYSTEM.

Application filed August 22, 1928, Serial No. 301,390, and in Germany September 2, 1927.

My invention relates to the control of induction motors by means of a regulator machine concatenated therewith and has for its principal object the suppression of hunting which may be initiated by disturbances in the source or in the excitation circuit.

It is well known to control the speed of an induction motor by means of a separately excited machine connected in cascade with the rotor and operating on a common shaft therewith. Such regulating machines are commonly excited from a synchronous motor generator set supplied by the same source as the induction motor. In such cascades hunting may occur in the exciter circuit, because of slight disturbances in the source, which result in torque pulsations in the main motor. In accordance with this invention such pulsations are suppressed by means of an anti-exciting winding on the stator of the regulating machine.

The novel features which I believe to be characteristic of my invention are pointed out in the appended claims. The invention itself, however, will best be understood by reference to the following description taken in connection with the accompanying drawing which illustrates diagrammatically an induction motor concatenated with a regulating machine which is provided with an anti-exciting winding in accordance with my invention.

Referring to the drawing in detail, 10 indicates the induction motor to be regulated receiving its power from a source 11. A regulating machine 12, the rotor of which is mounted on the common shaft 13, receives its excitation through its slip rings 14 from a synchronous generator 15. Generator 15 is driven by a synchronous motor 16 supplied by source 11. Brushes 17, of machine 12, are connected to the slip rings 18 of motor 10 through windings 19 and 20 which are in series with each other. Winding 19 is a compensating field winding designed to balance armature reaction and winding 20 is the anti-exciting or anti-hunting winding.

Winding 20 is indicated as being at right angles to winding 19 and is actually wound on the stator of machine 12 so as to be spaced substantially 90 electrical degrees from winding 19. It is a winding of comparatively few turns.

In operation the regulating machine 12 receives current at line frequency through its slip rings 14 from generator 15, and current at slip frequency from the slip rings 18 through its brushes 17. If slight hunting of motor 16 occurs the electromotive forces of 10, 12 and 15 will be periodically out of phase and thereby cause comparatively large circulating currents to flow between motor 10 and machine 12 which results in torque pulsations of the motor 10. Under normal operating conditions the current flowing through winding 20 effects a demagnetization of machine 12 which is balanced by the current received from generator 15. During hunting, however, the circulating currents being superimposed upon the normal operating currents, the effect of winding 20 exceeds the balancing effect of the received generating current and the result is a suppression of armature current in machine 12. Winding 20 being in series with the armature, a gradual reduction of the circulating current is effected until normal conditions are reached.

What I claim as new and desire to secure by Letters Patent of the United States is:

1. In combination an inductor motor, a commutator machine concatenated therewith, a synchronous generator connected to the slip rings of said commutator machine and means for suppressing hunting including an anti-exciting winding wound on the stator of said commutator machine and connected in series with the slip rings of said induction motor.

2. In combination an induction motor, a polyphase commutator machine concatenated therewith, a compensating winding in series with the armature of said commutator machine, a synchronous generator connected to the slip rings of said commutator machine, and means for suppressing hunting including an anti-exciting winding wound on the stator of said commutator machine spaced substantially 90 electrical degree from said compensating winding, and connected in series with said compensating winding and the slip rings of said induction motor.

In witness whereof, I have hereunto set my hand this 7th day of August, 1928.

WILHELM WEILER.